(12) United States Patent
Thubert et al.

(10) Patent No.: US 11,570,653 B2
(45) Date of Patent: Jan. 31, 2023

(54) SYNCHRONIZED DETECTION OF WIRELESS DEVICE FRAME BY WIRELESS ACCESS POINTS FOR OPTIMIZED ACCESS POINT ALLOCATION BY NETWORK CONTROLLER

(71) Applicant: Cisco Technology, Inc., San Jose, CA (US)

(72) Inventors: Pascal Thubert, Roquefort les Pins (FR); Jerome Henry, Pittsboro, NC (US); Patrick Wetterwald, Mouans Sartoux (FR); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 341 days.

(21) Appl. No.: 16/994,829

(22) Filed: Aug. 17, 2020

(65) Prior Publication Data

US 2022/0053361 A1     Feb. 17, 2022

(51) Int. Cl.
*H04W 28/02* (2009.01)
*H04W 28/08* (2009.01)

(52) U.S. Cl.
CPC ........... *H04W 28/0236* (2013.01); *H04W 28/0268* (2013.01); *H04W 28/0812* (2020.05); *H04W 28/0975* (2020.05)

(58) Field of Classification Search
CPC ......... H04W 28/0975; H04W 28/0812; H04W 28/0268; H04W 28/0236; H04W 28/0215; H04L 47/28; H04L 45/08
See application file for complete search history.

(56) References Cited

U.S. PATENT DOCUMENTS 8,279,829 B2   10/2012   Xia et al.
9,351,157 B2    5/2016   Kapoor et al.
(Continued)

FOREIGN PATENT DOCUMENTS

WO    WO-2018232101 A1  *  12/2018  ........... H04B 7/0413

OTHER PUBLICATIONS

Khorov et al., "Current Status and Directions of IEEE 802.11be, the Future Wi-Fi 7", May 21, 2020, [online], [retrieved on Jul. 20, 2020]. Retrieved from the Internet: URL: <https://ieeexplore.ieee.org/stamp/stamp.jsp?arnumber=9090146>, pp. 88664-88688 (25 pages).
(Continued)

*Primary Examiner* — Mehmood B. Khan
(74) *Attorney, Agent, or Firm* — Behmke Innovation Group LLC; James M. Behmke; Jonathon P. Western

(57) ABSTRACT

In one embodiment, a method comprises causing, by a network controller device, a first access point (AP) device to initiate a reverse sounding operation comprising wirelessly requesting a mobile constrained network device to transmit a null data packet (NDP) at a first transmission interval, wirelessly receiving the NDP at the first transmission interval, and generating a reception report describing reception of the NDP and including beamforming information; causing, by the network controller device, a second AP device to generate a corresponding reception report describing a corresponding wireless detection of the NDP at the first transmission interval; and causing, by the network controller device, the mobile constrained network device to connect to a selected one of the first AP device or the second AP device for an identified data flow based on the respective reception reports from the first and second AP devices.

20 Claims, 8 Drawing Sheets

(56) References Cited

U.S. PATENT DOCUMENTS

| | | | |
|---|---|---|---|
| 9,729,337 | B2 | 8/2017 | Janakirman |
| 9,859,970 | B2 | 1/2018 | Thubert et al. |
| 10,080,224 | B2 | 9/2018 | Thubert et al. |
| 10,524,267 | B2 | 12/2019 | Henry et al. |
| 10,548,146 | B2 * | 1/2020 | Chun .............. H04W 72/0446 |
| 10,567,267 | B2 | 2/2020 | Thubert et al. |
| 10,638,287 | B2 | 4/2020 | Thubert et al. |
| 11,405,084 | B1 * | 8/2022 | Changlani ............. H04L 5/0007 |
| 2002/0136291 | A1 * | 9/2002 | Sala ........................ G06F 40/18 375/240 |
| 2008/0192820 | A1 * | 8/2008 | Brooks .............. H04N 21/2402 348/E7.071 |
| 2017/0170937 | A1 * | 6/2017 | Chun .................... H04L 5/0023 |
| 2018/0139077 | A1 * | 5/2018 | Amizur ................. H04B 1/0064 |
| 2018/0263043 | A1 | 9/2018 | Zhou et al. |
| 2019/0132762 | A1 * | 5/2019 | Zhu ........................ H04B 7/024 |
| 2020/0045555 | A1 * | 2/2020 | Huang .................... H04W 4/06 |
| 2020/0107168 | A1 | 4/2020 | Thubert et al. |

OTHER PUBLICATIONS

Thubertet al., "IETF 6TSCH: Combining IPv6 Connectivity with Industrial Performance", Jul. 2013, [online], [retrieved on Nov. 9, 2017], Retrieved from the Internet: <URL: https://www.researchgate.net/profile/Pascal_Thubert/publication/261430569_IETF_6TSCH_Combining_IPv6_Connectivity_with_Industrial_Performance/links/56c4887c08ae7fd4625a28c8/IETF-6TSCH-Combining-IPv6-Connectivity-with-Industrial-Performance.pdf?origin=publication_detail>, pp. 1-7.

Audsley et al., "Real-Time System Scheduling", [online], [retrieved on Jul. 21, 2020], Retrieved from the Internet: URL: <http://beru.univ-brest.fr/~singhoff/cheddar/publications/audsley95.pdf>, 31 pages.

Cisco, "802.11r, 802.11k, 902.11v, 802.11w Fast Transition Roaming", Enterprise Mobility 8.1 Design Guide, Chapter 11, [online], [retrieved on Jul. 20, 2020]. Retrieved from the Internet: URL: <https://www.cisco.eom/c/en/us/td/docs/wireless/controller/8-1/Enterprise-Mobility-8-1-Design-Guide/Enterprise_Mobility_8-1_Deployment_Guide/Chapter-11.pdf>, pp. 1-28.

Cisco, "Configuring RRM", [online], [retrieved on Jul. 17, 2020]. Retrieved from the Internet: URL: <https://www.cisco.com/c/en/us/td/docs/wireless/controller/7-4/configuration/guides/consolidated/b_cg74_CONSOLIDATED/b_cg74_CONSOLIDATED_chapter_010000011.pdf>, pp. 1-22.

Wikipedia, "Earliest deadline first scheduling", Jul. 19, 2020, [online], [retrieved on Jul. 20, 2020], Retrieved from the Internet: URL: <https://en.wikipedia.org/w/index.php?title=Earliest_deadline_first_scheduling&printable=yes>, pp. 1-5.

Schmidt et al., "Multicast Listener Extensions for MIPv6 and PMIv6 Fast Handovers", Mar. 19, 2014, [online], Retrieved from the Internet: URL: <https://www.researchgate.net/publication/259688445_Multicast_Listener_Extensions_for_MIPv6_and_PMIPv6_Fast_Handovers>, pp. 1-29.

O'Reilly, "Chapter 4. Beamforming in 802.11ac", [online], [retrieved on Jul. 28, 2020], Retrieved from the Internet: URL: <https://www.oreilly.com/library/view/80211ac-a-survival/9781449357702/ch04.html>, 40 pages.

Kato et al., "Semi-Partitioned Fixed-Priority Scheduling on Multiprocessors", [online], [retrieved on Jul. 20, 2020]. Retrieved from the Internet: URL: <http://www.ertl.jp/~shinpei//papers/rtas09.pdf>, 10 pages.

Hobbs et al., "Optimal Soft Real-Time Semi-Partitioned Scheduling Made Simple (and Dynamic)", RTNS 2019, Nov. 6-8, 2019, Toulouse, France, [online], [retrieved on Jul. 21, 2020]. Retrieved from the Internet: URL: <https://www.cs.unc.edu/~anderson/papers/rtns19a.pdf>, 11 pages.

Thubert et al., U.S. Appl. No. 16/372,744, filed Apr. 2, 2019.

* cited by examiner

SYNCHRONIZED DETECTION OF WIRELESS DEVICE FRAME BY WIRELESS ACCESS POINTS FOR OPTIMIZED ACCESS POINT ALLOCATION BY NETWORK CONTROLLER

TECHNICAL FIELD

The present disclosure generally relates to synchronized detection of a wireless device frame by wireless access points for optimized access point allocation by a network controller.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Industrial Internet of Things (IIoT) involves a wide-scale deployment of interconnected constrained network devices, for example wireless sensors or "motes", having constrained resources such as limited battery power, limited memory size, and/or limited processor capacity: such constrained network device can be implemented at a low cost while providing a battery (and operating) lifetime of 10-20 years.

Effective deployment of IIoT requires reliable throughput, real-time performance, coverage, security, etc. for mobile constrained network devices seeking connectivity throughout a deployment area such as an industrial factory floor. The IEEE 802.11 Working Group is developing a proposal IEEE 802.11be ("Wi-Fi 7") as an amendment to the existing IEEE 802.11ax ("Wi-Fi 6").

A problem can exist, however, in that a mobile constrained network device should not be required to execute increasingly complex operations for reliable connection-based operations; moreover, a mobile constrained network device is not aware of network-based conditions encountered within a wireless network comprising multiple access point (AP) devices distributed throughout the deployment area.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
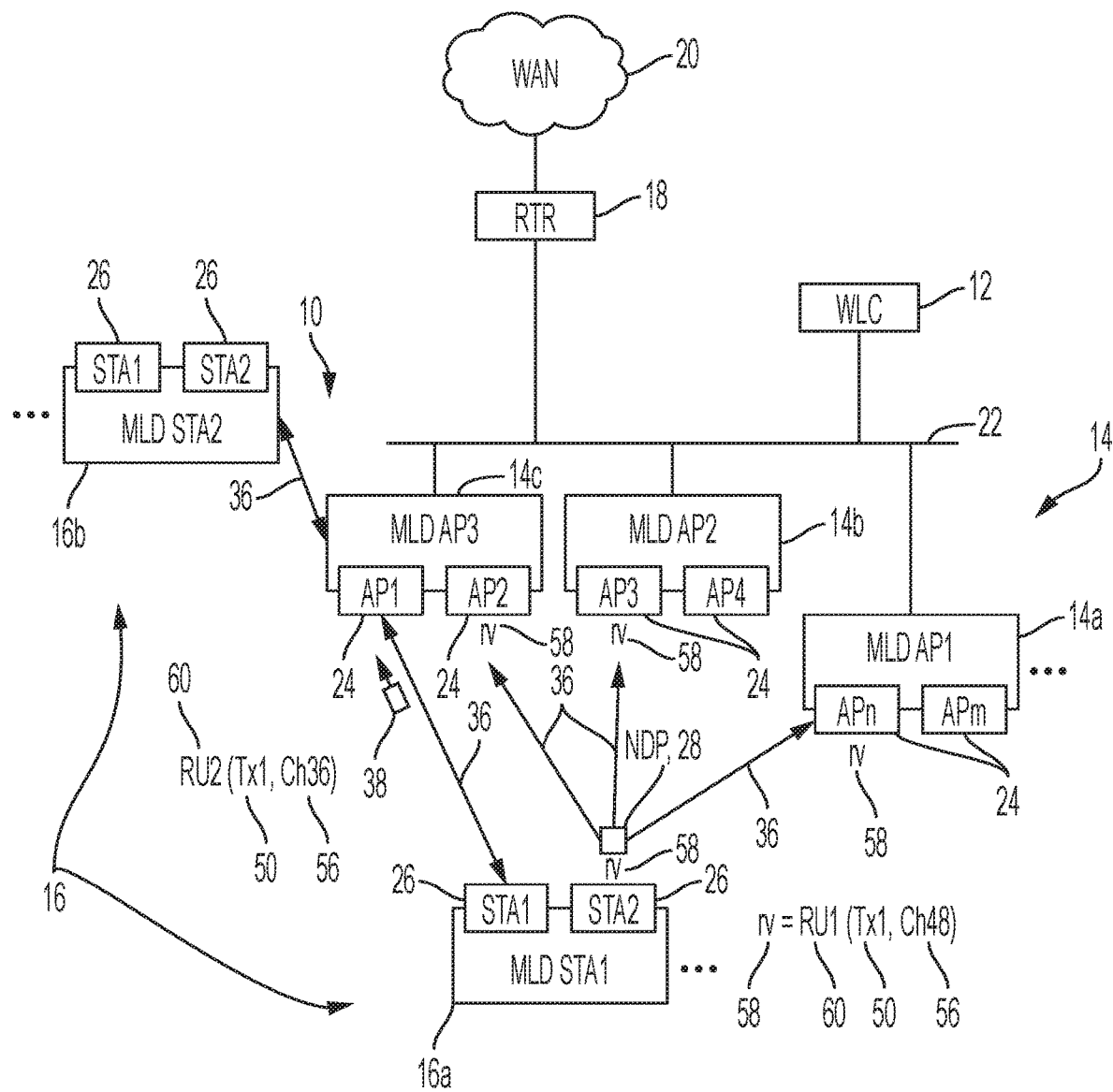
FIG. 1 illustrates an example data network having an apparatus configured for causing synchronized detection of a wireless device frame by wireless access points for optimized access point allocation by the apparatus, according to an example embodiment.

In one embodiment, a method comprises causing, by a network controller device, a first access point (AP) device to initiate a reverse sounding operation comprising wirelessly requesting a mobile constrained network device to transmit a null data packet (NDP) at a first transmission interval, wirelessly receiving the NDP at the first transmission interval, and generating a reception report describing reception of the NDP and including beamforming information; causing, by the network controller device, a second AP device to generate a corresponding reception report describing a corresponding wireless detection of the NDP at the first transmission interval; and causing, by the network controller device, the mobile constrained network device to connect to a selected one of the first AP device or the second AP device for an identified data flow based on the respective reception reports from the first and second AP devices.

In another embodiment, an apparatus comprises non-transitory machine readable media configured for storing executable machine readable code; a device interface circuit configured sending and receiving data frames in a data network; and a processor circuit. The processor circuit is configured for executing the machine readable code, and when executing the machine readable code operable for: causing a first access point (AP) device in the data network to initiate a reverse sounding operation comprising wirelessly requesting a mobile constrained network device to transmit a null data packet (NDP) at a first transmission interval, wirelessly receiving the NDP at the first transmission interval, and generating a reception report describing reception of the NDP and including beamforming information; causing a second AP device in the data network to generate a corresponding reception report describing a corresponding wireless detection of the NDP at the first transmission interval; and causing the mobile constrained network device to connect to a selected one of the first AP device or the second AP device for an identified data flow based on the respective reception reports from the first and second AP devices.

In another embodiment, one or more non-transitory tangible media are encoded with logic for execution by a machine and when executed by the machine operable for: causing, by the machine implemented as a network controller device, a first access point (AP) device to initiate a reverse sounding operation comprising wirelessly requesting a mobile constrained network device to transmit a null data packet (NDP) at a first transmission interval, wirelessly receiving the NDP at the first transmission interval, and generating a reception report describing reception of the NDP and including beamforming information; causing a second AP device to generate a corresponding reception report describing a corresponding wireless detection of the NDP at the first transmission interval; and causing the mobile constrained network device to connect to a selected one of the first AP device or the second AP device for an identified data flow based on the respective reception reports from the first and second AP devices.

DETAILED DESCRIPTION

Particular embodiments enable an apparatus (e.g., a wireless local area network (LAN) controller (WLC) or a learning machine) to provide a centralized optimization for allocating one or more access point (AP) devices for a mobile constrained network device or "station" (STA) that can be movable throughout a wireless LAN having multiple APs providing wireless coverage throughout the wireless LAN. The apparatus can provide the centralized optimization based on causing a plurality of selected AP devices in the WLAN to synchronize to a prescribed ("first") transmission interval that is allocated for a mobile constrained network device to transmit a null data packet (NDP) frame that does not comprise any payload data. The NDP frame can be transmitted by the mobile constrained network device, for example according to IEEE 802.11be, 802.11ax, 802.11ac ("Wi-Fi 5"), etc., where the NDP frame comprises prescribed patterns within its preamble (e.g., short preamble, long preamble) that can be used by a receiver to determine wireless effects, for example due to beamforming, multipath interference causing OFDM subcarrier/subtone destructive or constructive interference, etc.

The synchronization of the selected AP devices enables each synchronized AP device to wirelessly receive the NDP frame transmitted by the mobile constrained network device at the prescribed transmission interval, generate a corresponding reception report based on detecting link-layer and/or physical-layer attributes associated with receiving the NDP frame (e.g., received signal strength indicator (RSSI), link quality indicator (LQI), physical layer (PHY) data rate, receive matrix identifying OFDM subcarrier/subtone deviations, etc.) and forward at least selected information of the corresponding reception report to the WLC.

In one example embodiment, a wireless LAN controller (WLC) can synchronize the APs in a wireless LAN (e.g., deployed in a large lecture hall, auditorium, or factory floor): Wi-Fi 6 OFDMA can segregate the wireless medium into time and frequency domain-specific resource units (RUs), where each resource unit corresponds to a specific frequency channel at a specific time instance.

According to an example embodiment, the WLC can leverage Wi-Fi 6 OFDMA and/or 802.11be MLD to cause a selected "first" AP to initiate a "reverse sounding operation", where the selected first AP device is instructed by the WLC to send a reverse sounding request or "trigger" for the selected mobile constrained network device to transmit (in the "reverse" direction toward the AP device) an NDP frame at a specified "first" transmission interval (e.g., a prescribed resource unit (RU) for an identifiable frequency channel at the specified "first" transmission interval ("Tx1")). The first AP and at least a second AP are instructed to listen for the NDP frame from the selected mobile constrained network device at the specified "first" transmission interval; hence, each AP selected by the WLC for participation in the reverse sounding operation can listen for the NDP frame transmitted by the selected mobile constrained network device, and in response and determine a corresponding beam-forming angle, signal quality, etc., in response to reception of the NDP frame received in the RU, for generation of a corresponding reception report describing the corresponding reception of the NDP frame. Each AP can send at least a selected portion of the corresponding reception report to the WLC, enabling the WLC to determine the reception characteristics of the NDP frame from the selected mobile constrained network device from the perspective of the multiple selected AP devices.

Hence the WLC can respond to receiving reception results from each AP participating in the reverse sounding operation by identifying relative signal quality and characteristics for the selected mobile constrained network device, from the perspective of the multiple selected AP devices, to identify one or more optimum AP devices for reception of one or more identified data flows from the selected mobile constrained network device.

In another embodiment, the WLC can apply the reception results to schedule and select one or more APs that are optimized for receiving identified data flows from the selected mobile constrained network device. The WLC can apply various scheduling and optimization operations to identify the one or more APs to be used by the selected mobile constrained network device, for example based on the attributes and/or capabilities of the mobile constrained network device, relative to the traffic requirements and/or real-time constraints required for one or more identified flows of data packets from the mobile constrained network device (e.g., high-bandwidth, minimum jitter or minimum latency, guaranteed minimum QoS, guaranteed delivery by a prescribed deterministic deadline, etc.), and further relative to the status and capabilities of the available AP devices within wireless range of the selected mobile constrained network device (relative to other neighboring AP devices).

In a further embodiment, the WLC can schedule and select the one or more APs based on applying a "multi-core" based scheduling operation that previously had been used only for scheduling of processor tasks in a multiple-core processor system: the WLC can apply identified available bandwidth and signal quality at an identified AP as equivalent to processor capacity in the "multi-core" based scheduling operation; the WLC also can apply identified real-time deadlines relative to bounded latency requirements as equivalent to tack duration, periodicity, and/or task deadline in the "multi-core" based scheduling operation.

Hence, the example embodiments provide optimized allocation of AP devices to a selected mobile constrained network device, where the WLC can cause the selected mobile constrained network device to connect to one or more selected AP devices based on the determined reception results from the APs and the ("multi-core" based) scheduling and optimization operations. The example embodiments also enable a selected mobile constrained network device to use one or more APs that are optimized for different data flows transmitted by the selected mobile constrained network device and requiring different data flow constraints. Hence, the example embodiments can be applied to ensure of reliable delivery of critical data flows such as industrial control, professional audio/video, etc., in Wi-Fi 6/7 based wireless networks; the example embodiments also can be applied to 5G or IEEE 802.15.4 Time Slotted Channel Hopping (TSCH) or 6TiSCH based networks requiring reliable delivery of data packets according to strict deterministic constraints (e.g., according to DetNet, Time Sensitive (TSN), Reliable Available Wireless (RAW), etc.).

Deterministic networking (e.g., according to DetNet, Time Sensitive (TSN), Reliable Available Wireless (RAW), etc.) attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter (e.g., within twenty-five (25) milliseconds or less), and high packet delivery ratios (e.g., over ninety-nine percent (99%) based on less than one percent (1%) packet loss).

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. The tracks which are used by the different trains also may be selected so as to prevent collisions and to avoid one train from blocking the path of another train and delaying the blocked train.

Hence, the example embodiments can assign a plurality of mobile constrained network devices to different AP devices distributed throughout the WLAN, to ensure each AP device has sufficient bandwidth and signal quality for reception of identified data flows of data packets according to the required deterministic constraints of the identified data flows.

FIG. 1 is a diagram illustrating an example wireless local area network (WLAN) 10 comprising a wireless LAN controller (WLC) 12, multi-link device (MLD) access point (AP) devices 14, and MLD mobile constrained network devices 16. The WLAN 10 also can include an Internet Protocol (IP) based router 18 for communications between a mobile constrained MLD network device 16 and a remote destination (not shown) reachable via a private and/or public wide area network 20 such as the Internet. The wireless LAN controller 12 can communicate with each of the MLD AP devices 14, for example, via a wired data link 22 (although a wireless data link can be used between the wireless LAN controller 12 and each MLD AP device 14, if preferred).

Each MLD AP device 14 can comprise two or more AP transceiver devices 24 operable as PHY transceivers, and each mobile constrained MLD network device 16 can comprise two or more wireless station (STA) transceiver devices 26 operable as PHY transceivers. Although the example embodiments are described with respect to MLD devices such as an MLD AP device 14 and a mobile constrained MLD network device 16, the example embodiments are not limited to MLD devices but also can be applied to an AP device having a single AP transceiver device 24 as its wireless PHY transceiver and/or a mobile constrained network device having a single STA transceiver device 26 as its wireless PHY transceiver. Hence, the term "access point (AP) device" as used herein can be applied to an AP device having only a single AP transceiver device 24 as its PHY transceiver, and/or an MLD AP device 14, as appropriate; and the term "mobile constrained network device" as used herein can be applied to a mobile constrained network device having only a single STA transceiver device 26 as its PHY transceiver, and/or an MLD network device 16, as appropriate.

The example embodiments are particularly effective in deploying Wi-Fi 6/7 MLD AP devices 14 transmitting different types of data flows, for example industrial data flows and/or IoT data objects communicating over 802.11. In such example deployments, the industrial data flows and IoT data objects transmitted by a mobile constrained MLD network device 16 can have different data flow requirements that result in the optimum AP providing more than merely the "best RSSI". Hence, a mobile constrained MLD network device 16 implemented on a robot device relying on Operations, Administration and Management (OAM) traffic (controlled through automation with telnet-like application) can benefit from a MCS0, 6.5 Mbps connection; in contrast, a mobile constrained MLD network device 16 implemented on a robot device sending real time images to a pilot system (e.g. automated/video-guided screw driving system in a car assembly line) will need low latency and a bandwidth that depends on the video codec in use.

Concerns also arise in whether a Wi-Fi deployment can support the deterministic constraints of industrial data flows in an industrial environment, where the objects, their applications and (deterministic) flow requirements are known. However, prior Wi-Fi systems (relying on a mobile constrained MLD network device 16 to select its AP device for connection) are not adapted to the efficiency constraints required in industrial or deterministic flows because a mobile constrained MLD network device 16 is unaware of the state of the AP device chosen by the mobile constrained MLD network device 16. Further, prior Wi-Fi systems (e.g., according to IEEE 802.11be, 802.11ax, or 802.11ac) implemented channel sounding, where an Access Point (AP) transmitted a null data packet (NDP) frame to a wireless station (STA): the wireless station (STA) could analyze OFDM training fields in the NDP frame transmitted by the AP device, and in response the wireless station (STA) could generate and transmit a beamforming report containing a feedback matrix back to the AP that transmitted the NDP frame. Hence, the feedback matrix generated by a wireless station (STA) could cause the AP to generate a steering matrix that enabled the AP device to execute beamforming based on directing transmissions toward the wireless station (STA) using the steering matrix. Multiple user MIMO beamforming according to IEEE 802.11ac required different stations (STA) to transit their respective feedback matrices at different transmission intervals to avoid interfering with responses to the AP by other wireless stations. Hence, the prior Wi-Fi systems were concerned with an individual AP performing beamforming for an identified wireless station (STA).

In contrast, the example embodiments utilize "reverse" sounding operations (in the "reverse" direction from the STA to the AP device) that cause a selected wireless station (e.g., 16a) to generate and output an NDP frame 28 at an identified transmission interval "Tx1" 50, as opposed to transmission of an NDP frame by an AP device as in an IEEE 802.ac sounding operation; further, each MLD AP device 14 receiving the NDP frame 28 from the selected mobile constrained MLD network device 16 (e.g., 16a) can generate a corresponding distinct reception report describing reception of the NDP frame 28 by the corresponding MLD AP device 14 (e.g., 14a, 14b, and 14c). Hence, the wireless LAN controller 12 can compare and correlate the respective reception reports from the receiving MLD AP devices 14a, 14b, and 14c that describe the reception of the same NDP frame 28 transmitted by the mobile constrained MLD network device "MLD STA1" 16a at the transmission interval "Tx1" 50.

Example embodiments also can improve on traditional Wi-Fi based on the wireless LAN controller 12 providing optimal roaming determination for a movable mobile constrained MLD network device 16 within an infrastructure-driven environment having multiple available MLD AP devices 14.

More advanced deployments of a WLAN can involve a large number wireless access point devices (APs) (e.g., deployed across a factory floor); hence, although STAs can select among multiple available AP devices, a STA device lacks AP related information such as relative load and optimum transition signal, and therefore lacks any information regarding the condition of the WLAN 10, including a condition of a given AP device relative to other AP devices available for communications with the STA device. As illustrated in FIG. 1, an MLD AP device 14*c* ("MLD AP3") may comprise an AP transceiver device 24 that can provide the strongest signal to the mobile constrained MLD network device "MLD STA1" 16*a*, however the MLD AP device 14*c* also may be near capacity due to substantial network traffic from another mobile constrained MLD network device 16*b* ("MLD STAT2"). Hence, the STA device (e.g., "MLD STA1" 16*a*) can suffer poor wireless performance due to associating with a nearby AP device (e.g., "AP1" 24 in "MLD AP3" 14*c*) that provides the best signal strength (e.g., RSSI) but suffers from heavy network traffic, wireless interference (e.g., due to multipath fading, other electromagnetic interference), etc.

According to example embodiments, the wireless LAN controller 12 can select one or more MLD AP devices 14 (e.g., "MLD AP1" 14*a*, "MLD AP2" 14*b*) that are optimized for communications with a targeted mobile constrained MLD network device 16 (e.g., 16*a*). The wireless LAN controller 12 can select the one or more MLD AP devices 14 optimized for the targeted mobile constrained MLD network device 16 based on information provided by selected MLD AP devices 14 (e.g., "MLD AP1" 14*a*, "MLD AP2" 14*b*, and "MLD AP3" 14*c*), including selected reception information. The receive information can be based on: reception reports generated by the respective MLD AP devices 14 in response to reception of one or more null data packet (NDP) frames 28 transmitted by the targeted mobile constrained MLD network device "MLD STA1" 16*a* via a wireless data link 36; wireless transmitter (Tx) capabilities associated with the targeted mobile constrained MLD network device "MLD STA1" 16*a* (including physical transmission characteristics, physical location and/or velocity of the targeted mobile constrained MLD network device "MLD STA1" 16*a*, etc.); and/or flow-based requirements for one or more data flows transmitted by the targeted mobile constrained MLD network device "MLD STA1" 16*a*, etc. The wireless LAN controller 12 also can select the one or more MLD AP devices 14 (e.g., 14*a*, 14*b*) optimized for the targeted mobile constrained MLD network device 16 based on the relative capabilities of neighboring AP devices (e.g., 14*c*) in the WLAN 10.

Hence, the wireless LAN controller 12 can provide a "global" management of identified traffic flows within the WLAN 10 (e.g., within a factory infrastructure) based on identifying capabilities of each of the mobile constrained MLD network devices 16 relative to the capabilities of each of the MLD AP devices 14, and further relative to the flow-based requirements of each of the identified traffic flows transmitted by the mobile constrained MLD network devices 16 (e.g., QoS requirements, deterministic constraints related to minimal jitter/minimum latency/prescribed reception deadline, etc.). As described below, the wireless LAN controller 12 can apply a scheduling scheme that allocates AP devices to mobile constrained network devices 16 using a "multi-core" based scheduling. In one example if the AP position is known by the wireless LAN controller 12 then triangulation can be used to locate multiple mobile constrained MLD network devices 16, e.g., in a factory environment. A site survey in a factory environment can be used to more precisely identify the location of a given mobile constrained MLD network device 16 using known techniques, enabling the wireless LAN controller 12 to determine, on demand and in real time, which AP should be the best primary connection point for the STA, and which AP transceiver device 24 (within the same MLD AP device 14 or a different MLD AP device 14) could be a secondary connection point for less time-sensitive traffic.

Figure 2:
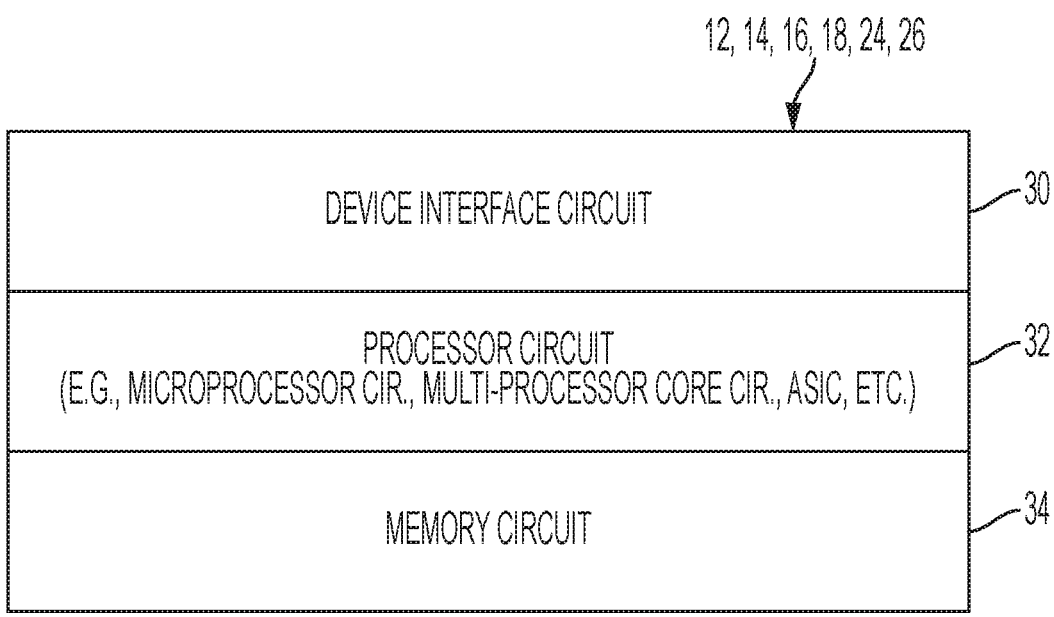
FIG. 2 illustrates an example implementation of any one of the devices of FIG. 1, according to an example embodiment.

FIG. 2 illustrates an example implementation of any one of the devices 12, 14, 16, 18, 24, and/or 26 of FIG. 1, according to an example embodiment. Each device 12, 14, 16, 18, 24, and/or 26 is a physical machine (i.e., a hardware device) configured for implementing network communications with other physical machines via the WLAN 10. The term "configured for" or "configured to" as used herein with respect to a specified operation refers to a device and/or machine that is physically constructed and arranged to perform the specified operation.

Each apparatus 12, 14, 16, 18, 24, and/or 26 can include a device interface circuit 30, a processor circuit 32, and a memory circuit 34. The device interface circuit 30 can include one or more distinct physical layer transceivers for communication with any one of the other devices 12, 14, 16, 18, 24, and/or 26; the device interface circuit 30 also can include an IEEE based Ethernet transceiver for communications with the devices of FIG. 1 via any type of data link (e.g., a wired or wireless link, an optical link, etc.). The processor circuit 32 can be configured for executing any of the operations described herein, and the memory circuit 34 can be configured for storing any data or data packets as described herein.

Depending on implementation, each MLD AP device 14 can be implemented to include one or more AP transceiver devices 24 as integrated devices (where any one of the device interface circuit 30, the processor circuit 32, and/or the memory circuit 34 can be integrated as a single unit or discrete shared components) or discrete components therein that communicate via a wired data bus. Each mobile constrained MLD network device 16 also can be implemented to include one or more STA transceiver devices 26 as integrated devices (where any one of the device interface circuit 30, the processor circuit 32, and/or the memory circuit 34 can be integrated as a single unit or discrete shared components) or discrete components therein that communicate via a wired data bus. Hence, in some instances radios (e.g., 24 or 26) need not necessarily be hosted in the same physical device (e.g., 14 or 16), rather multiple radios can be distributed to form a "virtualized" device (e.g., a virtualized MLD AP 14) having a larger wireless coverage area.

Any of the disclosed circuits of the devices 12, 14, 16, 18, 24, and/or 26 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 3A:
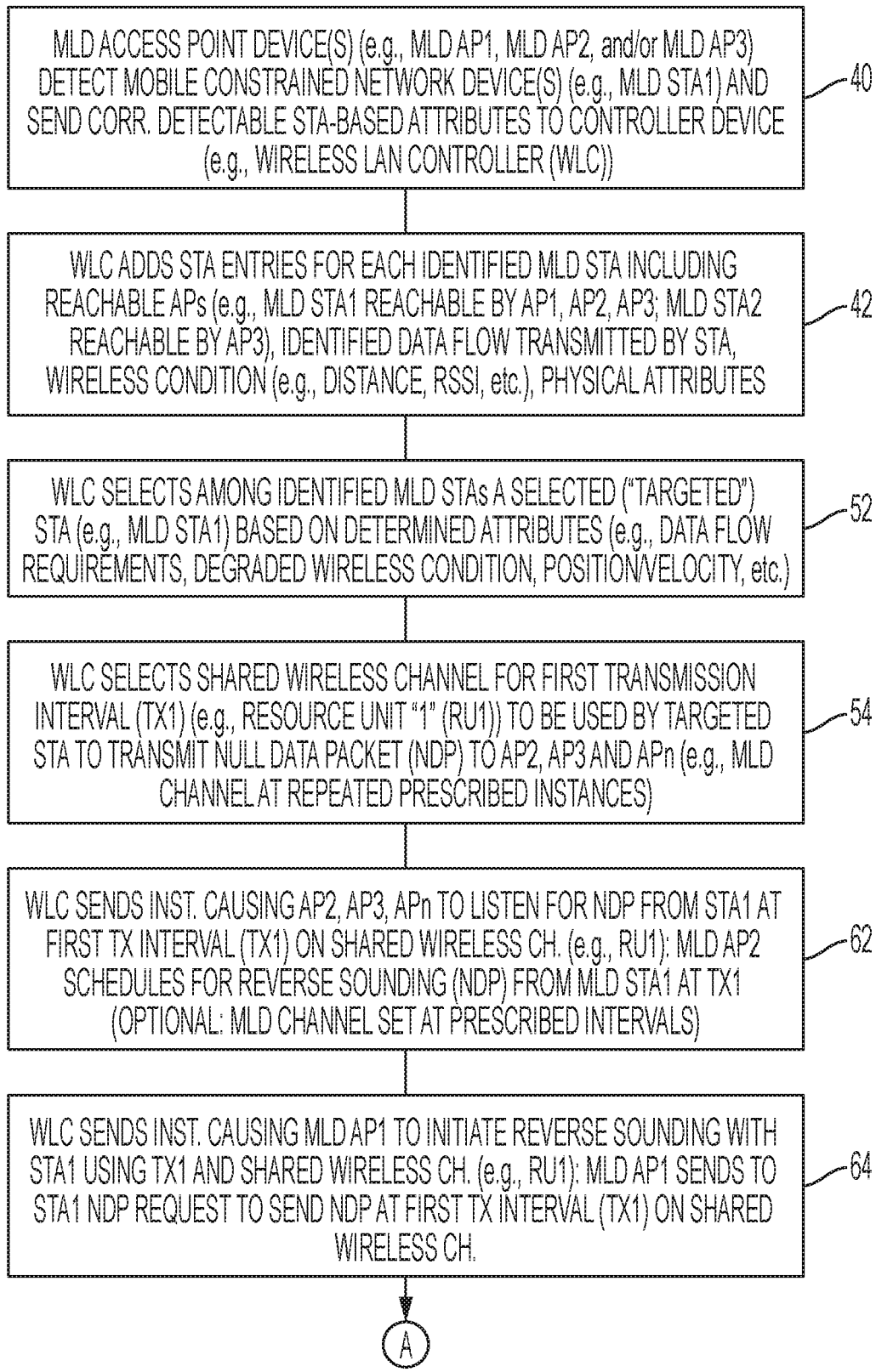
FIGS. 3A-3B illustrate an example method of an apparatus causing synchronized detection of a wireless device frame by wireless access points for optimized access point allocation by the apparatus, according to an example embodiment.
Figure 3B:
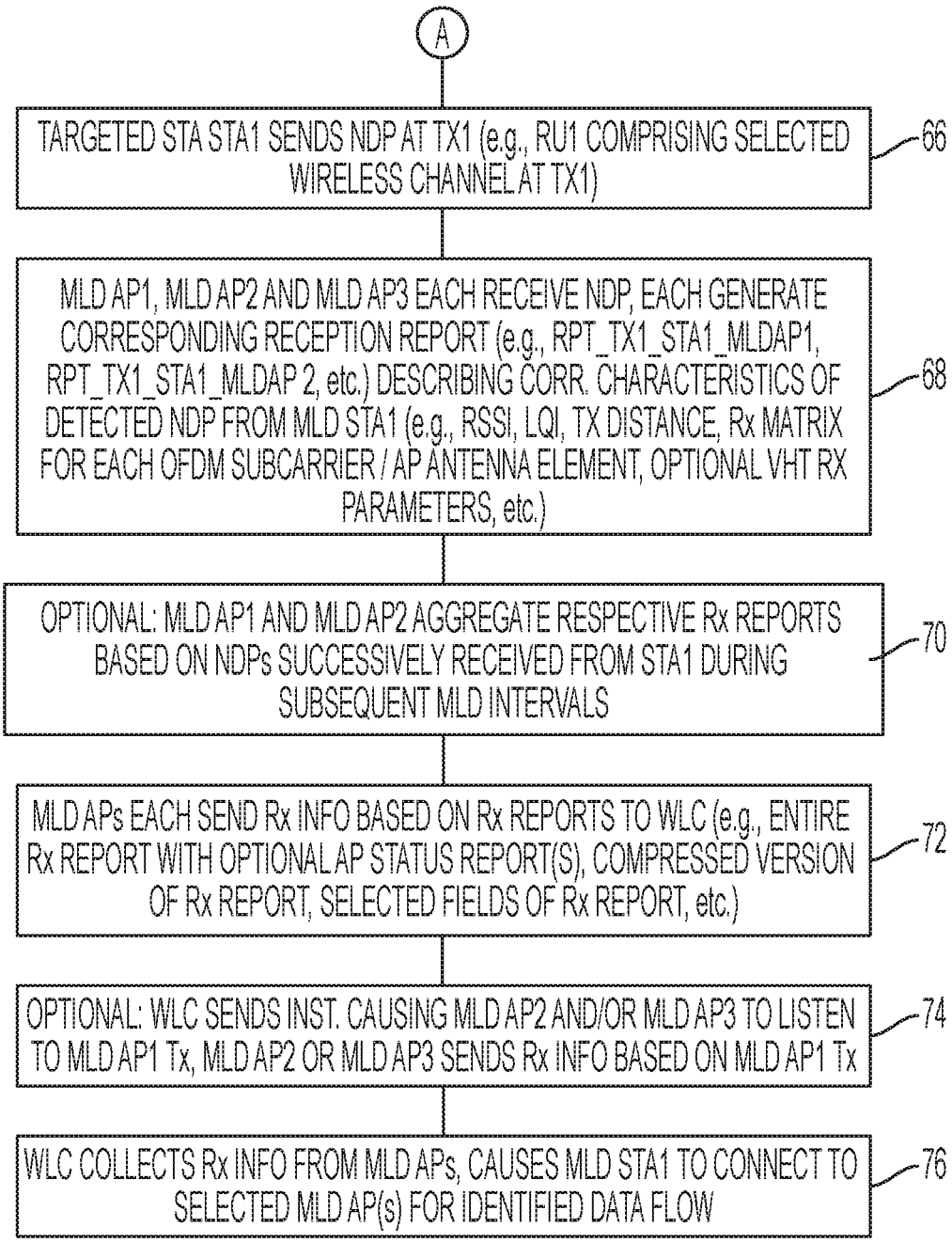

FIGS. 3A-3B illustrate an example method of a wireless LAN controller 12 causing synchronized detection of a wireless device frame by wireless access points for optimized access point allocation by the apparatus, according to an example embodiment.

Figure 4A:
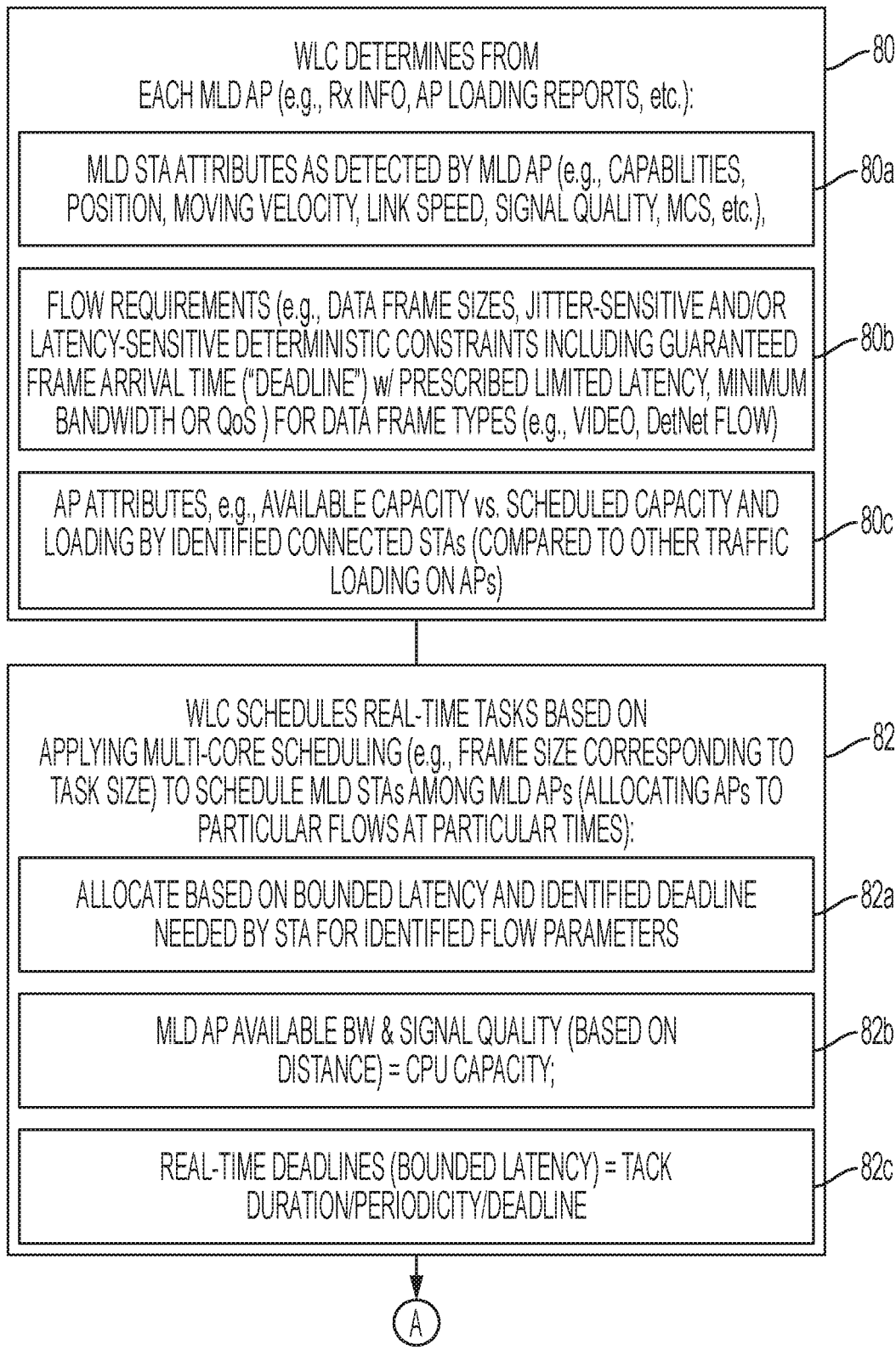
FIGS. 4A-4B illustrate examples of optimized access point scheduling and allocation by the apparatus of FIG. 1 based on selected information from reception reports generated by the wireless access points having synchronously detected the wireless device frame from a mobile constrained network device, according to an example embodiment.
Figure 4B:
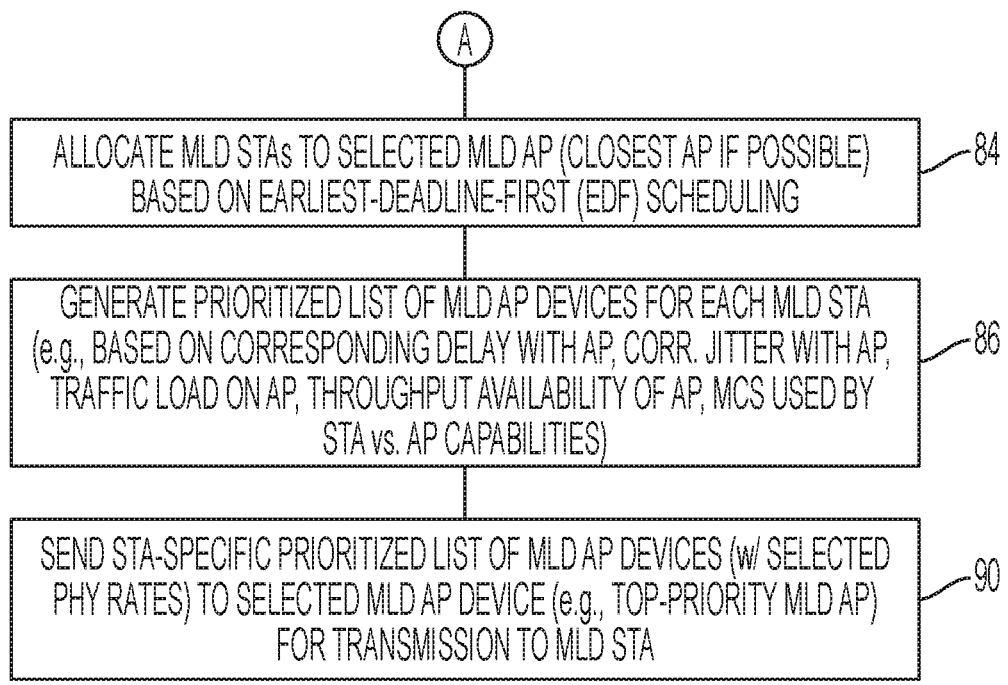

FIGS. 4A-4B illustrate examples of optimized access point scheduling and allocation by the apparatus of FIG. 1 based on selected information from reception reports generated by the wireless access points having synchronously detected the wireless device frame from a mobile constrained network device, according to an example embodiment.

Figure 5:
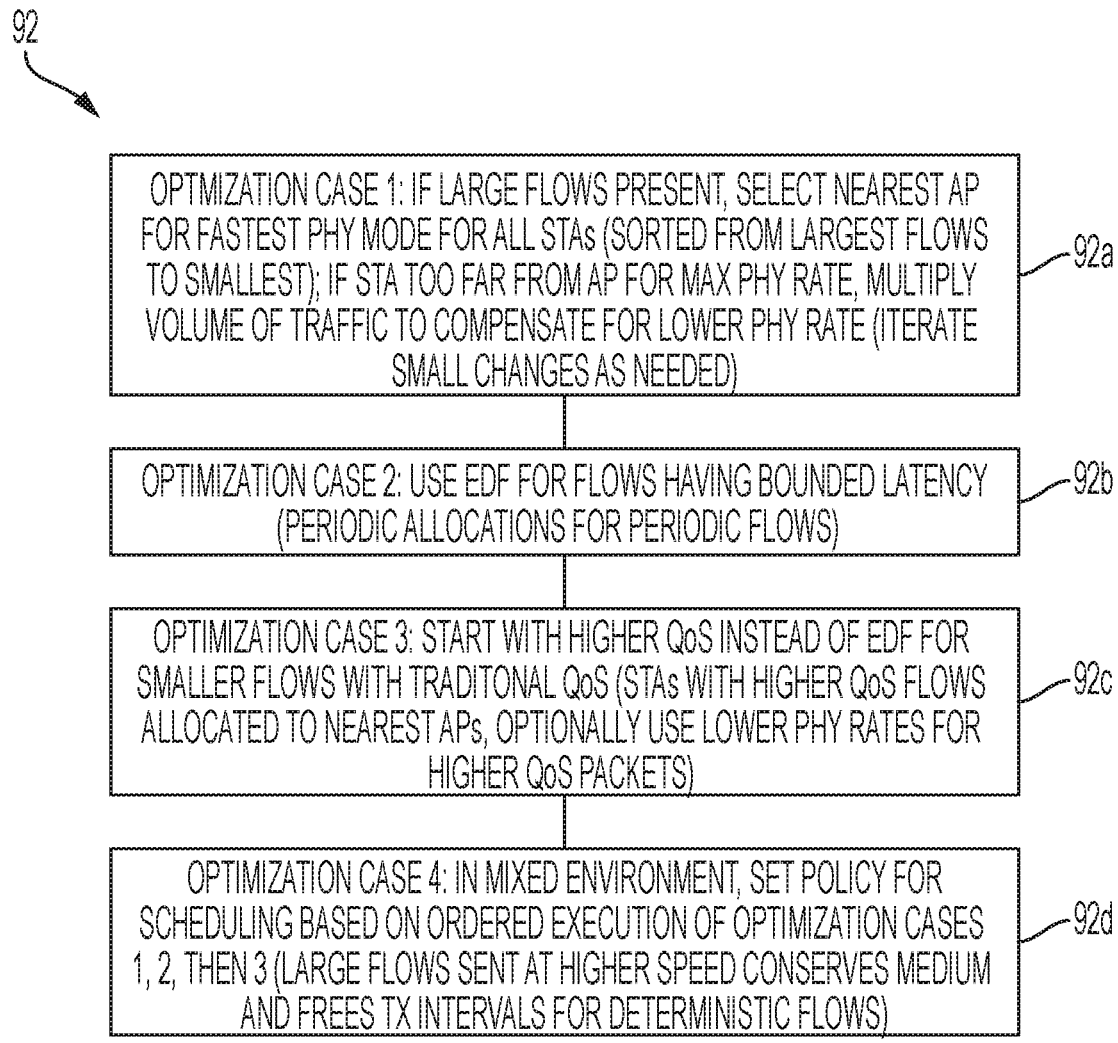
FIG. 5 illustrates example optimized access point scheduling and allocations of FIGS. 4A-4B, according to an example embodiment.

FIG. 5 illustrates example optimized access point scheduling and allocations of FIGS. 4A-4B, according to an example embodiment.

Figure 6:
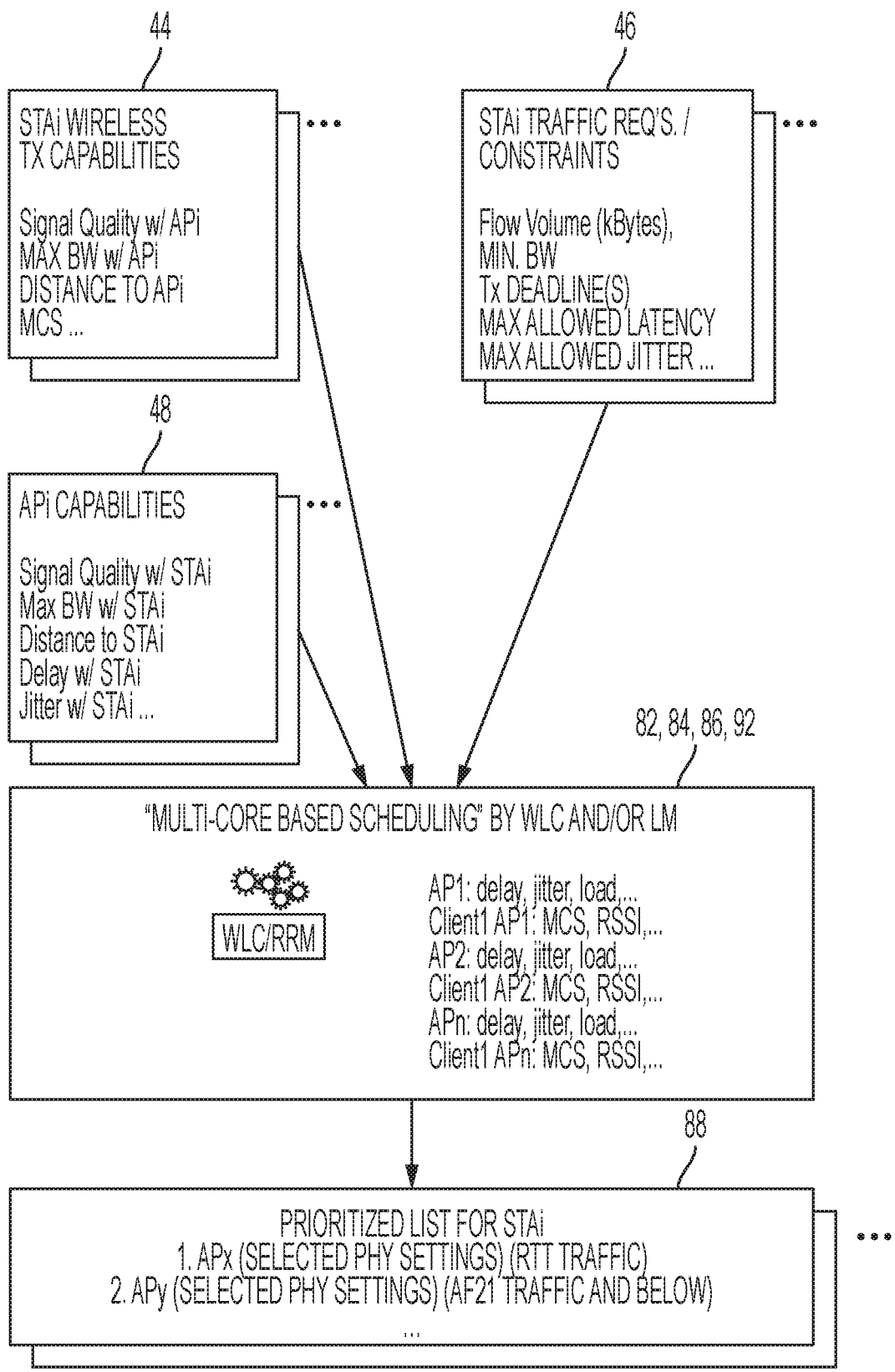
FIG. 6 illustrates example optimized access point scheduling and allocation based on selected information from reception reports generated by the wireless access points, including generating a prioritized list of selected access point devices for a selected mobile constrained network device, according to an example embodiment.

FIG. 6 illustrates example optimized access point scheduling and allocation based on selected information from reception reports generated by the wireless access points, including generating a prioritized list of selected access point devices for a selected mobile constrained network device, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

OFDMA Reverse Sounding Among Multiple AP Devices for Optimized MLD-Based AP Selection Referring to FIG. 3A, any one or more of the MLD AP devices 14 (e.g., "MLD AP1" 14a, "MLD AP2" 14b, and/or "MLD AP3" 14c) can respond to detecting in operation 40 a mobile constrained MLD network device 16 (e.g., MLD STA1 16a and/or MLD STA2 16b) by generating and sending detectable attributes associated with the mobile constrained MLD network device 16 (e.g., MLD STA1 16a) ("mobile device-based attributes") to a network-based controller, illustrated for example as a wireless LAN controller 12. As illustrated in FIG. 1, the mobile constrained MLD network device "MLD STA1" 16a can be detected by each of the MLD AP devices 14a, 14b, and 14c, hence the MLD AP device 14b (and 14c) can detect the mobile constrained MLD network device "MLD STA1" 16a and in response can generate and send corresponding mobile device-based attributes describing the detection of the mobile constrained MLD network device "MLD STA1" 16a.

In response to the device interface circuit 30 of the wireless LAN controller 12 receiving the mobile device-based attributes of the mobile constrained MLD network device 16 (e.g., 16a) generated by one or more of the MLD AP devices 14, the processor circuit 32 of the wireless LAN controller 12 in operation 42 can create or update, for each mobile constrained MLD network device 16, a corresponding mobile device capabilities entry (44 of FIG. 6) that describes the particular wireless transmission (Tx) capabilities and/or Tx characteristics of the mobile constrained MLD network device 16 (as detected by the MLD AP device 14 having generated the mobile device-attributes); the processor circuit 32 of the wireless LAN controller 12 also can generate a corresponding mobile device flow requirements entry (46 of FIG. 6) that describes the particular constraints required by the mobile constrained MLD network device 16 for one or more identified flows.

The processor circuit 32 of the wireless LAN controller 12 also can generate or update in operation 42 an AP capabilities entry 48 that specifies, for each MLD AP device 14, relevant attributes associated with communication with each connected mobile constrained MLD network device 16, including an identification of each mobile constrained MLD network device 16 reachable by the corresponding MLD AP device 14 (for example on a per-AP transceiver device 24 basis) and a second identification of those reachable mobile constrained network devices that have also associated with the corresponding MLD AP device 14 for communications within the wireless LAN 10, corresponding signal quality with the corresponding mobile constrained MLD network device 16, maximum bandwidth available to the mobile constrained MLD network device 16, distance to the mobile constrained MLD network device 16 (e.g., based on RSSI and/or LQI), LQI value for the mobile constrained MLD network device 16, determined transmission delay with the mobile constrained MLD network device 16 (e.g., based on timestamp values in received packets relative to AP local clock values), determined jitter with the mobile constrained MLD network device 16, etc. The AP capabilities entry 48 for each MLD AP device 14 also can specify the processor loading encountered by the MLD AP device 14, traffic loading on its wireless AP transceiver devices 24, traffic loading on its wired PHY transceiver, memory utilization, etc.

An alternate data structure generated by the processor circuit 32 of the wireless LAN controller 12 can include a STA-AP entry that describes the attributes of each MLD AP device 14 (on a per-AP transceiver device 24 basis) with a connected mobile constrained MLD network device 16, for example a corresponding entry for "STA1-AP1", "STA1-AP2", "STA1-AP3", STA1-AP4", etc.

As described in further detail below, the processor circuit 32 of the wireless LAN controller 12 can apply selected attributes from any one or more of the entries 44, 46, and/or 48 for selection of a mobile constrained MLD network device 16 to transmit a NDP frame 28 as part of a reverse sounding operation, and/or for selection of one or more MLD AP devices 14 to provide wireless associations for receive wireless data flows from a mobile constrained MLD network device 16 according to selected constraints, including deterministic constraints, QoS constraints, etc.

The processor circuit 32 of the wireless LAN controller 12 can respond to detection of the mobile constrained MLD network devices 16 by selecting one of the identified mobile constrained MLD network devices 16 (e.g., 16a) for executing a reverse sounding operation, including transmitting a NDP frame 28 to multiple selected MLD AP devices 14 at a selected first transmission interval "Tx1" 50, described below. In particular, the processor circuit 32 of the wireless LAN controller 12 in operation 52 can select the mobile constrained MLD network device "MLD STA1" 16a, for generation of the NDP frame 28 used for selection of an optimized AP device, based on identification of an identified data flow (e.g., as identified by a corresponding mobile device flow requirements entry 46) transmitted by the mobile constrained MLD network device 16 as a prescribed data type (e.g., video, industrial control frame) requiring a determined quality of service (QoS): the determined QoS can be based on one or more of a guaranteed minimum bandwidth (e.g., for video transmissions) or a guaranteed frame arrival time within a prescribed limited latency (e.g., for a deterministic industrial control frame requiring delivery to an identified destination at a precise delivery time with near-zero jitter).

The processor circuit 32 of the wireless LAN controller 12 in operation 52 also can select a mobile constrained MLD network device 16 for executing a reverse sounding operation based on detecting the mobile constrained MLD network device 16 is encountering a degraded wireless transmission condition, for example based on determined changes in the corresponding mobile device capabilities entry 44 during one or more updates, or based on determining a mobile constrained MLD network device 16 is reporting a substantially degraded condition (based on determined changes in the corresponding AP capabilities entry 48 during one or more updates). The processor circuit 32 of the wireless LAN controller 12 in operation 52 can select the mobile constrained MLD network device 16 for executing the reverse sounding operation based on determining, for example from an update of the mobile device capabilities entry 44, a corresponding position of the mobile constrained MLD network device 16 relative to identified APs (e.g., 14a, 14b, and/or 14c) based on reports received from the APs connected to the MLD AP device 14 (e.g., 14a, 14b, and 14c).

The processor circuit 32 of the wireless LAN controller 12 in operation 54 can select an available wireless channel 56 (e.g., "Ch. 48") for use by the selected MLD mobile constrained network device "STA1" 16a to transmit a NDP frame 28 at a selected transmission interval "Tx1" 50, also referred to herein as a "rendezvous channel" ("rv") 58 in the case where MLD-capable devices are present and utilize resource units 60 as in Wi-Fi 6 and above. As illustrated in FIGS. 1 and 3A, the processor circuit 32 of the wireless LAN controller 12 can designate the selected wireless channel 56 ("Ch. 48") at the first transmission interval "Tx1" using a selected resource unit "RU1" 60, where the resource unit "RU1" 60 is a prescribed allocation of the frequency channel "Ch48" 56 at the selected transmission interval "Tx1" 50. The wireless LAN controller 12 in operation 54 also can establish an identified rendezvous channel ("rv") 58 using an identified resource unit (e.g.,"RU1" 60) for MLD AP devices 14 and mobile constrained MLD network devices 16 utilizing resource units 60. Alternately, for non-MLD devices (e.g., having only a single PHY transceiver) the processor circuit 32 of the wireless LAN controller 12 in operation 54 can specify the individual wireless channel 56 (e.g., "Ch. 48") at the transmission interval "Tx1" 50 within instructions that are sent in operations 62 and 64, described below.

Hence, the processor circuit 32 of the wireless LAN controller 12 in operation 54 can select an available wireless channel (e.g., a resource unit "RU1" 60 as a "rendezvous channel" ("rv") 58) that can be used by multiple selected MLD AP devices 14 (described below) to receive the NDP frame 28 transmitted by the selected mobile constrained MLD network device "MLD STA1" 16a at the selected transmission interval "Tx1" 50. In contrast, a second resource unit "RU2" 60 can be allocated by the processor circuit 32 of the wireless LAN controller 12 used by the STA transceiver device "STA1" 26 of the mobile constrained MLD network device "MLD STA1" 16a to transmit a data packet 38 comprising payload data (e.g., an application-based data packet) at the same transmission interval "Tx1" 50 on a different wireless channel 56 (e.g., "Ch36" to a different AP transceiver device 24 (e.g., "AP1" 24 of the MLD AP device 14c) that is not participating in the reverse sounding operation, described below.

The processor circuit 32 of the wireless LAN controller 12 in operation 54 also can specify the shared wireless channel 58 as a multi-link device (MLD) channel for concurrent reception of multiple NDP frames 28 (by the MLD AP devices 14a, 14b, and 14c) at respective prescribed ("scheduled") instances of the transmission interval "Tx1" 50. Hence, the processor circuit 32 can specify a prescribed MLD channel that identifies the channel "Ch48" 56 at the first instance of the transmission interval "Tx1" 50 (e.g., at time t=100 ms), the channel "Ch40" 56 at the second (next)

instance "Tx1(2)" of the transmission interval "Tx1" 50 (e.g., at time t=400 ms), etc., enabling use of a single MLD channel as a rendezvous channel 58 over multiple instances of the reverse sounding operation. As described below, the wireless LAN controller 12 can repeat operation 52 for measuring reverse sounding operation results on different wireless channels 56 for identification of transients as a function of time and/or frequency.

The processor circuit 32 of the wireless LAN controller 12 in operation 62 can generate and output an instruction causing the MLD AP devices 14b and 14c (that are not associated with the targeted mobile constrained MLD network device "MLD STA1" 16a) to listen for reception of a NDP frame 28 at the rendezvous channel 58 that is identified by the wireless channel "Ch48" 56 at the first transmission interval "Tx1" 50. The processor circuit 32 of the MLD AP device 14b can cause its corresponding AP transceiver device "AP3" 24 to listen on the specified wireless channel "Ch48" 56 at the first transmission interval "Tx1" 50 for reception of the NDP frame 28 transmitted by the mobile constrained MLD network device "MLD STA1" 16a, and the processor circuit 32 of the MLD AP device 14c can cause its corresponding AP transceiver device "AP2" 24 to listen on the specified wireless channel "Ch48" 56 at the first transmission interval "Tx1" 50 for reception of the NDP frame 28 transmitted by the mobile constrained MLD network device "MLD STA1" 16a. As described below, the instruction output by the wireless LAN controller 12 in operation 62 also causes each of the MLD AP devices 14b and 14c to generate a corresponding reception report describing reception of the NDP frame 28, including beamforming information identified by the corresponding MLD AP device 14 during detection of the NDP frame 28.

In the case of non MLD devices, the instruction generated and output by the wireless LAN controller 12 in operation 62 can specify that a non-associated AP device (e.g., "APx, APy") selected for participation in the reverse sounding operation should "eavesdrop" (i.e., listen promiscuously) for an NDP frame 28 to be transmitted on the specified wireless channel "Ch48" 56 at the first transmission interval "Tx1" 50. The instruction causes each of the selected non-associated AP devices (e.g., "APx, APy") to tune its corresponding single AP transceiver 24 to the specified wireless channel for reception of the NDP frame 28 at the first transmission interval "Tx1" 50.

The processor circuit 32 of the wireless LAN controller 12 in operation 64 also can generate and output an instruction causing the processor circuit 32 of the MLD AP device 14a (that is associated with the targeted mobile constrained MLD network device "MLD STA1" 16a) to initiate (in operation 66 of FIG. 3B) a reverse sounding operation at the selected transmission interval "Tx1" 50 and wireless channel 56 (specified in the instruction, for example, as the resource unit "RU1" 60 for the rendezvous channel 58 or a prescribed MLD "MLD1" for the rendezvous channel 58). The instruction generated by the wireless LAN controller 12 causes the processor circuit 32 of the MLD AP device 14a to generate and send, to the targeted mobile constrained MLD network device "MLD STA1" 16a, a reverse sounding request for the targeted mobile constrained MLD network device "MLD STA1" 16a to generate and output a NDP frame 28 at the selected transmission interval "Tx1" 50 and wireless channel 56 (specified in the request, for example, as the resource unit "RU1" 60 for the rendezvous channel 58 or a prescribed MLD "MLD1" for the rendezvous channel 58). The instruction generated by the wireless LAN controller 12 also causes the processor circuit 32 of the MLD AP device 14a to tune its STA transceiver device "APn" to the selected resource unit "RU1" 60 for reception of the NDP frame 28, and generate a corresponding reception report describing reception of the NDP frame 28 (and including beamforming information, described below).

Hence, the rendezvous channel 58 serves as a shared wireless channel for wireless reception by each of the selected MLD AP devices 14a, 14b and 14c during the reverse sounding operation by the NDP frame 28. The example embodiment exploits the use of different transceiver devices 24 for distinct operations concurrently (e.g., 2.4 GHz on one AP device 24 and 80 MHz on another AP device 24). In another embodiment, AP devices can use a boundary channel (e.g. AP1, AP3 and APn 24 are 80 MHz-capable transceivers set to 40 MHz on Ch 36 or 40; and AP2, AP4, and APm are 80 MHz-capable set to Ch. 56, 52, or rendezvous channel 48). Hence, multiple APs can reach a mobile constrained MLD network device 16 based on channel expansion.

In the case of non MLD devices, the instruction generated and output by the wireless LAN controller 12 in operation 64 can specify that the associated AP device should generate and output a reverse sounding request that causes the targeted mobile device to transmit an NDP frame 28 on the specified wireless channel "Ch48" 56 at the first transmission interval "Tx1" 50. The instruction output by the wireless LAN controller also causes the associated AP device to tune its corresponding AP transceiver 24 to the specified wireless channel for reception of the NDP frame 28 at the first transmission interval "Tx1" 50. The reverse sounding request generated and output by the MLD AP device 14a (e.g., on the AP transceiver device "APm" 24) can cause the targeted mobile constrained MLD network device "MLD STA1" 16a to generate and transmit in operation 66, on its STA transceiver device "STA2" 26, a null data packet (NDP) frame 28 on the rendezvous channel 58 at the resource unit "RU1" 60, illustrated as the wireless channel "Ch48" 56 at the transmission interval 50. The NDP frame 28 comprises a short preamble (also referred to as short training field (STF)) of prescribed OFDM symbols, and a long preamble (also referred to as long training field (LTF)) of prescribed OFDM symbols; however, the NDP frame 28 contains no payload data nor any frame check sequence (FCS) appended to the end of the frame, hence the term "null" data packet to distinguish from link layer "data" frames that comprise payload data following a link layer header, followed by an FCS that enables a receiver to perform a checksum validation of the data packet and its payload.

As described previously, each of the MLD AP device 14a, 14b, and 14c can respond to the instructions generated by the wireless LAN controller 12 in operations 52 and 54 by tuning their respective AP transceiver devices "APn" 24, "AP3" 24, and "AP2" 24 to the resource unit "RU1" 60 for concurrent reception in operation 68 of the NDP frame 28 transmitted by the STA transceiver device "STA2" of the mobile constrained MLD network device "MLD STA1" 16a. Each allocated resource unit 60 can be temporal, or reserved at prescribed intervals by the wireless LAN controller 12 for reverse sounding operations for critical client devices, critical traffic, detected events in the wireless network 10 such as an MLD device (e.g., 16a) moving between coverage areas of neighboring MLD AP devices 14 (e.g., from 14a and 14b to 14b and 14c)

Each of the AP transceiver devices "APn" 24, "AP3" 24, and "AP2" 24 selected for reception of the NDP frame 28 at the rendezvous channel 58 in operation 68 can determine physical layer and/or link layer attributes of the received NDP frame 28, including received signal strength (RSSI), link quality indicator (LQI), transmitter distance (based on the RSSI and/or LQI), and beamforming information; each of the AP transceiver devices "APn" 24, "AP3" 24, and "AP2" 24 can generate, as part of the beamforming information, a receive matrix for each OFDM subcarrier per AP antenna element based on the detection of prescribed OFDM symbols at prescribed subcarrier frequencies ("tones") in the short and/or long preamble of the received NDP frame 28, and in response generate a receive matrix (each OFDM subcarrier can be processed independently in the receive matrix by the AP transceiver device 24). The receive matrix can specify, for each OFDM per AP antenna element, a determined deviation from the corresponding OFDM symbol as detected by the AP antenna element.

Depending on implementation, each AP transceiver device "APn" 24, "AP3" 24, and "AP2" 24 selected for reception of the NDP frame 28 in operation 68 also can determine "Very High Throughput" (VHT) receive parameters based on VHT training fields following the preamble (containing the short training field and the long training field) in the NDP frame 28; hence, the VHT receive parameters can identify deviations from prescribed values in the VHT training fields, and add the VHT receive parameters to the beamforming information of the receive matrix.

As noted previously, the "receive matrix" generated by an AP transceiver device 24 (and/or its MLD AP device 14) in response to receiving the NDP frame 28 from a STA transceiver device 26 is distinct from a "feedback matrix" as in IEEE 802.11be, 802.11ax, or 802.11ac, because the "feedback matrix" in IEEE 802.11be, 802.11ax, or 802.11ac is generated by a STA in response to receiving an NDP frame from an AP device, as opposed to the receive matrix which is generated by an AP transceiver device 24 (and/or its MLD AP device 14) in response to receiving the NDP frame from the STA.

As illustrated in FIG. 3B, each of the AP transceiver devices "APn" 24, "AP3" 24, and "AP2" 24 selected for reception of the NDP frame 28 also can selectively aggregate in operation 70 the respective reception reports based on successive reception of multiple NDP frames 28 from the mobile constrained MLD network device "MLD STA1" 16a during subsequent MLD intervals. Hence, the STA transceiver device "STA2" 26 of the mobile constrained MLD network device "MLD STA1" 16a can modify its tuning parameters for its PHY transceiver in its device interface circuit 30 (e.g., for adjusting a different OFDM parameter from its beamforming matrix) during each successive transmission of a NDP frame 28, enabling the wireless LAN controller 12 to determine multiple reverse sounding results as detected by each of the transceiver devices "APn" 24, "AP3" 24, and "AP2" 24 over different instances of the transmission interval 50 on an MLD channel. The modifying of tuning parameters (e.g., "rotating" of the beamforming index) enables the wireless LAN controller 12 to test beamforming matrix combinations that may be optimal for any one or more of the transceiver devices "APn" 24, "AP3" 24, or "AP2" 24.

Hence, the processor circuit 32 of the wireless LAN controller 12 can determine that one beamforming index ("BI1") utilized by the transceiver device "STA2" 26 provides better reception performance for the transceiver device "AP2" 24, whereas another beamforming index ("BI2") utilized by utilized by the transceiver device "STA2" 26 provides better reception performance for the transceiver devices "APn" 24 and "AP3" 24.

The wireless LAN controller 12 also can send instructions to the MLD AP devices 14 requesting that each associated AP device 24 instructed to listen for an NDP frame 28 on a rendezvous point channel 58 also can attempt to transmit a "probe" request using different multiple beamforming matrix combinations to the transmitting STA transceiver device 26, and successively record which beamforming combinations causes the STA transceiver device 26 to respond (indicating successful transmission of the "probe" request using an identified beamforming matrix combination). Hence, the MLD AP devices 14 can report to the wireless LAN controller 12 the one or more beamforming matrix combinations used by one or more of the AP transceiver devices 24 and that provide optimized communications with a specific transceiver device 26. The wireless LAN controller 12 also can send instructions in operation 54 requesting that different wireless channels be utilized for respective reverse sounding operations, for identification of wireless channels that are better suited (or worse suited) for transmission with the targeted mobile constrained MLD network device 16.

Hence, each of the AP transceiver devices 24 having received the NDP frame 28 at the rendezvous channel 58 (or their associated MLD AP devices 14) can generate in operation 72 a corresponding reception report (STA→AP reception report) describing reception of the NDP frame 28 at one or more instances of the rendezvous channel 58. The STA→AP reception report generated by the processor circuit 32 of an AP transceiver device 24 (and/or the processor circuit 32 of an associated MLD AP device 14) can include selected beamforming information (e.g. on a per-tone basis), including for example detected deviations from prescribed OFDM symbol values over prescribed tones. Each AP transceiver device 24 can send in operation 72 at least a portion of its corresponding STA→AP reception report to the wireless LAN controller 12: the at least a portion of the STA→AP reception report can be implemented as either a transmission of a complete reception report with optional AP status reports, a compressed version of STA→AP reception report, or selected fields of the STA→AP receive report, etc.

If desired, the wireless LAN controller 12 in operation 74 also can send an instruction to the MLD AP device 14b and/or the MLD AP device 14c to listen to one or more transmissions by the MLD AP device 14a; hence, the processor circuit 32 of the MLD AP device 14b and/or 14c each can generate a reception report (APx→APy reception report) based on received transmissions from the MLD AP device 14a ("APx"), and send at least selected portions of the APx→APy reception report to the wireless LAN controller 12 for evaluation of the reception characteristics of the MLD AP device 14a at the respective MLD AP devices 14b and 14c.

As described in further detail below with reference to FIGS. 4-6, the processor circuit 32 of the wireless LAN controller 12 in operation 76 can collect the reception information from the MLD AP devices 14a, 14b, and 14c, and in response cause the mobile constrained MLD network device "MLD STA1" 16a to connect to a selected one (or more) of selected MLD AP devices 14 (e.g., "APn" 24 of the MLD AP device 14a and "AP3" 24 of the MLD AP device 14b using the beamforming index "BI2") based on at least selected information from the respective reception reports generated by the MLD AP devices 14a, 14b, and 14c. As described in further detail below, the processor circuit 32 of the wireless LAN controller 12 in operation 76 can execute optimization of the connections by mobile constrained MLD network devices 16 to one or more MLD AP devices 14 based on executing a "multi-core based scheduling" that can schedule and select a mobile constrained MLD network device 16 for connected to one or more selected MLD AP devices 14 within required deadlines (e.g., a bounded latency relative to an identified deadline), relative to other mobile constrained MLD network devices 16 contending for access to any one or more of the MLD AP devices 14.

Optimized Scheduling of Data Flows to AP Devices as Tasks to Multiple Resources

FIGS. 4A-4B, 5, and 6 illustrate examples of optimized scheduling and allocation of different AP transceiver devices 24 in one or more MLD AP devices 14, for one or more mobile constrained MLD network devices 16, by the wireless LAN controller 12 of FIG. 1 based on selected information from reception reports generated by the AP transceiver devices 24 or MLD AP devices 14 having synchronously detected a NDP frame 28 from a mobile constrained network device such as the mobile constrained MLD network device "MLD STA1" 16a, according to an example embodiment.

Example embodiments enable the wireless LAN controller 12 (or another controller device, for example distributed controllers among the MLD AP devices 14 or learning machines in the network) to allocate the mobile constrained MLD network devices 16 to the AP transceiver devices 24 of selected MLD AP devices 14 based on the results captured by the AP devices 24 as described previously with respect to FIGS. 1 and 3A-3B: the wireless LAN controller 12 can allocate the STAs 16 to the APs 24 (or 14) using an optimization algorithm that matches AP device resources to identified data flows based on determined flow requirements. The identified data flows and associated requirements for the data flows (QoS, Volume) can be measured from each STA, inferred by learning machines, and/or signaled by applications that require high QoS or high bandwidth. STAs that need high amounts of bandwidth can be allocated in priority to the nearest AP to use the fastest PHY modes. STAs that need high QoS can be placed with AP devices providing sufficient quality QoS and the APs can be instructed to use lower PHY modes to improve quality.

The example embodiments can execute scheduling and optimization techniques that can execute real-time scheduling of data flows (from STA devices) to selected AP devices in a manner analogous to scheduling processor tasks to multiprocessor core devices in multiprocessor systems. Real-time scheduling techniques for multiprocessors can be mainly classified into global scheduling and partitioned scheduling. In global scheduling, all tasks are stored in a global queue, and the same number of the highest priority tasks as processors are selected for execution. This scheduling class contains optimal algorithms, such as Pfair and LLREF. Any periodic task systems are scheduled successfully by those algorithms, if the processor utilization does not exceed 100%.

In contrast, partitioned scheduling first assigns tasks to specific processors, and then causes the tasks to be executed on those processors without migrations. Partitioned scheduling is of advantage in that a problem of multiprocessor scheduling is reduced into a set of uniprocessor cores, after tasks are partitioned.

Example embodiments can include a controller device (e.g., the WLC 12, distributed "smart" MLD AP devices 14, etc.) scheduling real time flows of data frames such as found in industrial networking (e.g., deterministic networking, Time Sensitive Networks (TSN), Reliable and Available Wireless (RAW), etc.). The WLC can apply processor multi-core scheduling to schedule the Wi-Fi 6 and/or Wi-Fi 7 flows, using the following analogy: the available bandwidth in each AP (and/or MLD AP) is analogous to the CPU capacity in processor multi-core scheduling, and the tack duration, periodicity and deadline in processor multi-core scheduling are analogous to the IP flows properties. The example embodiments add signal quality per AP as a scheduling attribute to scheduling tasks over multiple cores, for example as a second pass in the scheduling. Hence, scheduling operations previously used to assign tasks on processors/cores can be used to assign STA to APs, mapping processor time to air time.

The wireless LAN controller 12 also can apply earlier-deadline first (EDF) scheduling as it offers reduced overhead compared to global scheduling, and can reduce bandwidth capacity loss compared to partitioned scheduling. Partitioned scheduling has the advantage to reduce the amount of STA roaming that will be needed. Hence, processor scheduling can be applied to STA scheduling over APs, providing both a fast computation and ensuring that most STAs remain attached to the same AP most of the time. This example embodiment can extend the existing optimization algorithms by using new metrics and priorities, applying EDF in general and possibly a larger class of optimization algorithms; it is not limited to semi-partitioned scheduling which is taken as an example embodiment.

Hence, the wireless LAN controller 12 can execute scheduling of critical data flows (e.g., industrial control and professional audio/video) to AP devices as tasks to multiple resources in a scalable manner such that the AP devices have sufficient bandwidth to provide access to the STA devices within a bounded latency for the expected volumes of data traffic. Although illustrated in a WLAN using Wi-Fi 6/7, the example embodiments also can be as applied to 5G or IEEE 802.15.4 TSCH (6TiSCH) that require precise delivery of data packets according to prescribed schedules, with near-zero jitter (e.g., 25 milliseconds or less) and almost no packet loss (e.g., 1% or less).

In one embodiment, the processor circuit 32 of the wireless LAN controller 12 is configured for executing a variation or extension of existing optimal scheduling algorithms such as used for assigning real-time tasks with arbitrary ready times and deadlines in multi-core systems such as EDF-fm and its optimizations thereof.

Referring to FIG. 4A, the processor circuit 32 of the wireless LAN controller 12 in operation 80 can determine attributes of any MLD AP device 14, a mobile constrained MLD network device 16, or associated attributes of an identified data flow as described previously with respect to FIGS. 3A and 3B, including receiving at least part of a reception report (also referred to as "Rx info") from an MLD AP device 14 describing communications with a mobile constrained MLD network device 16 based on the above-described reverse-sounding operation and that includes beamforming information, receiving status reports (e.g., AP loading reports) from an MLD AP device 14 including available capacity versus allocated capacity, and flow requirements.

The processor circuit 32 of the wireless LAN controller 12 in operation 80a can determine from the information (received from one or more of the MLD AP devices 14) various MLD STA attributes including device capabilities for the corresponding mobile constrained MLD network device 16 (e.g., PHY version, maximum data rate, device type and available hardware resources vs. installed hardware resources, battery level, etc.), physical position of the corresponding mobile constrained MLD network device 16 (e.g., based on LQI information, geospatial information such as GPS information, etc.), moving velocity (e.g., in the case of a moving robotic device on a factory floor), link speed (e.g., AP1 is 80 MHz capable, AP2 is 40 MHz capable), etc. OFDM based signal quality, modulation and coding scheme (MCS) attributes that are used to determine available data rates of wireless connections via wireless data links 36, identification of an AP device to which the mobile constrained network device 16 has "associated" for communications within the wireless LAN 10, etc. The processor circuit 32 of the wireless LAN controller 12 in operation 80*a* can store and/or update each of these attributes in a corresponding mobile device capabilities entry 44, illustrated in FIG. 6.

The processor circuit 32 of the wireless LAN controller 12 in operation 80*b* can determine from the information (received from one or more of the MLD AP devices 14) various flow-based requirements, for example data frame sizes, jitter-sensitive and/or latency-sensitive deterministic constraints that can include a guaranteed frame arrival time (or "deadline") with a prescribed limited latency (e.g., less than five microseconds for deterministic flows relying on deterministic network precision as in DetNet, TSN, and/or RAW), a minimum bandwidth or QoS, etc., and include an identification of the data flow type associated with the flow-based requirements (e.g., high-definition video, DetNet flow for control traffic in an industrial production line, etc.). The processor circuit 32 of the wireless LAN controller 12 in operation 80*b* can store and/or update each of these attributes in a corresponding mobile device flow requirements entry 46, illustrated in FIG. 6.

The processor circuit 32 of the wireless LAN controller 12 in operation 80*c* also can determine from the information (received from one or more of the MLD AP devices 14) various attributes and capabilities of each of the AP transceiver devices 24 of an identified MLD AP device 14. The attributes and capabilities can include, for example, available capacity (e.g., processor capacity, memory capacity, bandwidth capacity, etc.) relative to scheduled capacity and loading for each connected STA transceiver device 26 having connected to the MLD AP device 14 or having been allocated by the wireless LAN controller 12; the processor circuit 32 of the wireless LAN controller 12 in operation 80*c* also can correlate the available capacity and scheduled capacity/loading relative to the relative scheduled capacity/loading encountered by other neighboring MLD AP devices 14 that are within wireless range of a corresponding connected STA transceiver device 26. The processor circuit 32 of the wireless LAN controller 12 in operation 80*c* can store and/or update each of these attributes in a corresponding AP capabilities entry 48, illustrated in FIG. 6. Each of the entries 44, 46, and/or 48 can be stored in the device interface circuit 30 of the wireless LAN controller 12 and/or another locally-reachable storage device.

Hence, the scheduling and selecting of a mobile constrained MLD network device 16 to an MLD AP device 14 as described below can be relative to other mobile constrained MLD network devices 16 contending for access to any of the other AP transceiver devices 24 or MLD AP devices 14 based on the attributes stored in the associated AP capabilities entries 48; the scheduling and selecting also can utilize any one or more of the mobile device capabilities entries 44, the mobile device flow requirements entries 46, and/or the AP capabilities entry 48 for load balancing between different MLD AP devices 14, for example based on determined signal quality, available bandwidth, etc., relative to the determined requirements of other mobile constrained MLD network devices 16.

The processor circuit 32 of the wireless LAN controller 12 in operation 82 can schedule real-time tasks based on applying multi-core scheduling (e.g., EDF-fm) to STA traffic over the available MLD AP devices 14 in the WLAN 10, where the frame size can correspond to task size in multi-core scheduling, and available AP transceiver devices 24 can be allocated to particular identified data flows at particular time instances relative to "deadlines" associated with required transmission times (e.g., deterministic schedules). In one example, the processor circuit 32 of the wireless LAN controller 12 in operation 82*a* can allocate real-time tasks within a required bounded latency relative to one or more identified deadlines needed by a mobile constrained MLD network device 16 for identified flow parameters (as specified in the corresponding mobile device flow requirements entry 46) relative to the determined signal quality and available bandwidth of the selected AP device AP transceiver device 24 (as specified in the corresponding AP capabilities entry 48).

The processor circuit 32 of the wireless LAN controller 12 in operation 82*b* also can model available bandwidth and signal quality (based on distance) as equivalent to CPU capacity in the multi-core scheduling. The processor circuit 32 of the wireless LAN controller 12 in operation 82*c* also can model real-time deadlines associated with bounded latency requirements as equivalent to tack duration, periodicity, or deadline in the multi-core scheduling.

Referring to FIG. 4B, the processor circuit 32 of the wireless LAN controller 12 in operation 84 also can allocate one or more STA transceiver devices 26 in a mobile constrained MLD network device 16 to an identified AP transceiver device 24 of a selected MLD AP device 14 identified as closest based on EDF scheduling, for example for STAs 26 that have large flows (Audio/Video, file transfer) and short deadlines (DetNet/TSN/RAW); hence, other STAs having lower-size data flows or non-deterministic attributes (i.e., no deadlines such as TCP traffic) can be moved to the remaining APs for further bandwidth negotiation as appropriate.

The processor circuit 32 of the wireless LAN controller 12 in operation 86 also can generate a prioritized list (88 of FIG. 6) of MLD AP devices 14 for each mobile constrained MLD network device 16 (e.g., "APn of MLD AP1 for FLOW1"; "AP3 of MLD AP2 for FLOW2"; "AP4 of MLD AP2 for all other flows" for "MLD STA1") based on the above-identified attributes, for example based on corresponding delay with the MLD AP device 14 relative to other MLD AP devices 14, corresponding jitter with the selected MLD AP devices 14, traffic load, throughput availability, MCS used by the STA vs. AP capabilities, etc.). Hence, in one example the processor circuit 32 of the wireless LAN controller 12 can select the AP transceiver device "APn" 24 of MLD "AP1" 14*a* for "FLOW1" output by the mobile constrained MLD network device "MLD STA1" 16*a* based on determining the AP transceiver device "APn" 24 has a higher throughput than one or more other neighboring AP transceiver devices (e.g., "AP3" 24 or "AP2" 24 of the MLD AP device 14*b*), even though the AP transceiver device "APn" 24 of MLD "AP1" 14*a* has a weaker wireless signal relative to the AP transceiver devices 24 of the MLD AP device 14*b*.

The processor circuit 32 of the wireless LAN controller 12 can implement operation 76 of FIG. 3B in operation 90 based on sending the STA-specific prioritized list of allocated MLD AP devices 14 to a selected MLD AP device 14 (e.g., 14a), for example the top-level priority MLD AP device 14 specified in the prioritized list 88, with instructions to transmit the prioritized list 88 to the target mobile constrained MLD network device 16 (e.g., 16a). Hence, the mobile constrained MLD network device "MLD STA1" 16a can respond to reception of the prioritized list 88 by establishing multiple wireless connections with the MLD AP device 14a and 14b for directed transmission of the identified flows according to the prioritized list 88 generated by the wireless LAN controller 12.

FIG. 5 illustrates additional example optimizations 92 that can be executed by the wireless LAN controller 12 as part of the real-time scheduling in operations 82 and 84. The optimization 92 that can be executed by the wireless LAN controller 12 can be based on a determined use case.

In one example, in the case 92a where large flows are present, e.g., Audio/Visual real-time media data flows with cameras or Advertisement screens, the wireless LAN controller 12 can start the optimization by selecting the nearest AP (as opposed to earliest deadline in EDF) in order to ensure that the fastest PHY mode can be used for all STAs, sorting from the largest flows to the smallest. The PHY rate can be estimated in advanced from the location and signal perceived by the AP. If the wireless LAN controller 12 determines an AP is too far from a STA, the volume of traffic used for computation can be multiplied to compensate the lower PHY rate. The wireless LAN controller 12 also can iterate small changes from an initial condition if an initial solution is not readily available, enabling the wireless LAN controller 12 to determine if an alternate solution exists.

In the case 92b where identified data flows have a bounded latency, the wireless LAN controller 12 can utilize EDF and its variations. The wireless LAN controller 12 also can leverage the periodic nature of identified data flows, enabling a computation by the wireless LAN controller 12 to be reused for multiple iterations or "rounds" of an identified data flow (e.g., periodic data bursts); hence, the wireless LAN controller 12 can minimize the necessity of any recomputation for a periodic data flow to on demand transmissions. For instance, a recomputation can start as a delta triggered either by a change in radio conditions or a change in the active flows. The wireless LAN controller 12 can adapt its scheduling and selecting to account for a number of retries within a deadline. The deadline information can be passed to an identified MLD AP device 14 for its local scheduling that includes other flows, which is relatively inexpensive to compute since the global optimization has ensured that the MLD AP device 14 has sufficient resources for at least the considered flows with a deadline.

In the case 92c of smaller flows with traditional QoS, the wireless LAN controller 12 can first utilize a higher QoS instead of EDF-based scheduling. Hence, the STAs that have the higher QoS flows are attributed the nearest APs. Lower PHY rates can be attributed to higher QoS packets.

In the case 92d in a mixed environment, the wireless LAN controller 12 can set a policy that indicates the order in which the above cases 92a, 92b, and/or 92c are applied to establish the global priority. The wireless LAN controller 12 can establish a default ordering of cases 92a, 92b, and 92c, as an optimal ordering, since large flows sent at higher speed can provide the best conservation of the wireless transmission medium, and frees up other intervals of time for deterministic flows.

In another example, the wireless LAN controller 12 can implement a policy that transmit opportunities are maintained at short intervals of duration in the presence of bounded latency, and long data frames can possibly be fragmented to enable the interleaving of packets with a deadline.

According to example embodiments, a WLC can select an AP for each STA based on parameters such as signal quality as measured by each AP for each STA, amounts of traffic per STA, and QoS/deadline requirements. The example embodiment provides variations of the EDF algorithm to favor criteria that are specific to radio transmission and optimize the load balancing between APs, as opposed to simply the task deadline as done in EDF.

The example embodiments allocate the STAs to the APs based on the results captured by the APs using wireless specific extensions to readily-available optimization algorithms. The STAs are then assigned to the selected APs, and scheduling hints can be provided, e.g., periodic deadlines or PHY speed. The extended optimization algorithms ensure that the considered flows (known by QoS, periodic deadline, or Volume) are measured/known for each STA, and can be inferred by learning machines, and possibly signaled by applications that require high QoS, bounded latency or high bandwidth. STAs that need high amounts of bandwidth can be allocated in priority by the WLC to the nearest AP to use the fastest PHY modes. STAs that need high QoS can be placed by the WLC with sufficient quality and the APs can be instructed to use lower PHY modes to improve quality, so the bandwidth associated in the algorithm is larger than needed. The example embodiments could be particularly beneficial for professional audio/video systems and industrial systems relying on wireless solutions as opposed to IEEE TSN or AVB.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   causing, by a network controller device, a first access point (AP) device to initiate a reverse sounding operation comprising wirelessly requesting a mobile constrained network device to transmit a null data packet (NDP) at a first transmission interval, wirelessly receiving the NDP at the first transmission interval, and generating a reception report describing reception of the NDP and including beamforming information;
   causing, by the network controller device, a second AP device to generate a corresponding reception report describing a corresponding wireless detection of the NDP at the first transmission interval; and
   causing, by the network controller device, the mobile constrained network device to connect to a selected one of the first AP device or the second AP device for an identified data flow based on the respective reception reports from the first and second AP devices.

2. The method of claim 1, further comprising sending to the first AP device and the second AP device an instruction specifying a shared wireless channel for wireless reception of the NDP by each of the first and second AP devices at the first transmission interval.

3. The method of claim 2, wherein the instruction specifies the shared wireless channel for concurrent reception of a plurality of the NDPs at respective prescribed instances of the first reception interval.

4. The method of claim 1, further comprising the network controller device selecting the mobile constrained network device, for generation of the NDP used for selection of an optimized AP device, based on one or more of:
- identification of the identified data flow transmitted by the mobile constrained network device as a prescribed data type requiring a determined quality of service (QoS) based on one or more of a guaranteed minimum bandwidth or a guaranteed frame arrival time within a prescribed limited latency;
- detection that the mobile constrained network device is encountering a degraded wireless transmission condition; or
- determining a position of the mobile constrained network device relative to the first AP and the second AP based on the respective reception reports.

5. The method of claim 1, wherein the causing the mobile constrained network device to connect to the selected one AP device is based on the network controller device generating a prioritized list of the first and second AP devices, for AP device selection by the mobile constrained network device, based on one or more of:
- delay encountered by a corresponding AP device with the mobile constrained network device;
- jitter encountered by the corresponding AP device with the mobile constrained network device;
- traffic load on the corresponding AP device by other mobile network devices;
- throughput availability of the corresponding AP device; or
- a modulation and coding scheme (MCS) used by the mobile constrained network device.

6. The method of claim 1, wherein the causing the mobile constrained network device to connect to the selected one AP device is based on:
- scheduling and selecting the mobile constrained network device for connection to the selected one AP device within a bounded latency relative to an identified deadline required by the mobile constrained network device based on a determined signal quality and available bandwidth of the one AP device;
- the scheduling and selecting of the selected one AP device being relative to other mobile network devices contending for access to any one or more of the first AP device, the second AP device, or other AP devices providing reachability within a data network managed by the network controller device.

7. The method of claim 6, wherein the scheduling and selecting is based on executing an earliest-deadline-first operation that allocates the mobile constrained network device within the identified deadline, relative to scheduled start times of the other mobile network devices, respectively.

8. The method of claim 6, wherein the scheduling and selecting is based on one or more of:
- load balancing between the first and second AP devices and the other AP devices based on the respective determined signal quality and available bandwidth, relative to determined requirements of the other mobile network devices;
- selecting a closest available one of the first AP device, the second AP device, or the other AP devices;
- determining a data transmission rate based on a corresponding determined distance between the mobile constrained network device and at least one of the first AP device, the second AP device, or one or more of the other mobile network devices;
- selectively multiplying a determined volume of traffic by the mobile constrained network device based on identifying the determined data transmission rate is less than a prescribed maximum data transmission available at the selected one AP device;
- allocating a higher quality of service (QoS) than required for the identified data flow; or
- reapplying determined periodic data flows by the mobile constrained network device to subsequent instances of the scheduling and selecting, without a subsequent request by the mobile constrained network device.

9. An apparatus implemented as a physical machine, the apparatus comprising:
- non-transitory machine readable media configured for storing executable machine readable code;
- a device interface circuit configured sending and receiving data frames in a data network; and
- a processor circuit configured for executing the machine readable code, and when executing the machine readable code operable for:
- causing a first access point (AP) device in the data network to initiate a reverse sounding operation comprising wirelessly requesting a mobile constrained network device to transmit a null data packet (NDP) at a first transmission interval, wirelessly receiving the NDP at the first transmission interval, and generating a reception report describing reception of the NDP and including beamforming information,
- causing a second AP device in the data network to generate a corresponding reception report describing a corresponding wireless detection of the NDP at the first transmission interval, and
- causing the mobile constrained network device to connect to a selected one of the first AP device or the second AP device for an identified data flow based on the respective reception reports from the first and second AP devices.

10. The apparatus of claim 9, wherein the processor circuit is configured for sending to the first AP device and the second AP device an instruction specifying a shared wireless channel for wireless reception of the NDP by each of the first and second AP devices at the first reception interval.

11. The apparatus of claim 10, wherein the processor circuit is configured for specifying in the instruction the shared wireless channel for concurrent reception of a plurality of the NDPs at respective prescribed instances of the first reception interval.

12. The apparatus of claim 9, wherein the processor circuit is configured for selecting the mobile constrained network device, for generation of the NDP used for selection of an optimized AP device, based on one or more of:
- identification of the identified data flow by the mobile constrained network device as a prescribed data type requiring a determined quality of service (QoS) based on one or more of a guaranteed minimum bandwidth or a guaranteed frame arrival time within a prescribed limited latency;
- detection that the mobile constrained network device is encountering a degraded wireless transmission condition; or
- determining a position of the mobile constrained network device relative to the first AP and the second AP based on the reception report by the second AP and a corresponding reception report by the first AP in response to receiving the NDP response.

13. The apparatus of claim 9, wherein the processor circuit is configured for causing the mobile constrained network device to connect to the selected one AP device based on generating a prioritized list of the first and second AP devices, for AP device selection by the mobile constrained network device, based on one or more of:
- delay encountered by a corresponding AP device with the mobile constrained network device;
- jitter encountered by the corresponding AP device with the mobile constrained network device;
- traffic load on the corresponding AP device by other mobile network devices;
- throughput availability of the corresponding AP device; or
- a modulation and coding scheme (MCS) used by the mobile constrained network device.

14. The apparatus of claim 9, wherein the processor circuit is configured for causing the mobile constrained network device to connect to the selected one AP device based on:
- scheduling and selecting the mobile constrained network device for connection to the selected one AP device within a bounded latency relative to an identified deadline required by the mobile constrained network device based on a determined signal quality and available bandwidth of the one AP device;
- the scheduling and selecting of the selected one AP device being relative to other mobile network devices contending for access to any one or more of the first AP device, the second AP device, or other AP devices providing reachability within a data network managed by the network controller device.

15. The apparatus of claim 14, wherein the scheduling and selecting is based on the processor circuit executing an earliest-deadline-first operation that allocates the mobile constrained network device within the identified deadline, relative to scheduled start times of the other mobile network devices, respectively.

16. The apparatus of claim 14, wherein the scheduling and selecting by the processor circuit is based on one or more of:
- load balancing between the first and second AP devices and the other AP devices based on the respective determined signal quality and available bandwidth, relative to determined requirements of the other mobile network devices;
- selecting a closest available one of the first AP device, the second AP device, or the other AP devices;
- determining a data transmission rate based on a corresponding determined distance between the mobile constrained network device and at least one of the first AP device, the second AP device, or one or more of the other mobile network devices;
- selectively multiplying a determined volume of traffic by the mobile constrained network device based on identifying the determined data transmission rate is less than a prescribed maximum data transmission available at the selected one AP device;
- allocating a higher quality of service (QoS) than required for the identified data flow; or
- reapplying determined periodic data flows by the mobile constrained network device to subsequent instances of the scheduling and selecting, without a subsequent request by the mobile constrained network device.

17. One or more non-transitory tangible media encoded with logic for execution by a machine and when executed by the machine operable for:
- causing, by the machine implemented as a network controller device, a first access point (AP) device to initiate a reverse sounding operation comprising wirelessly requesting a mobile constrained network device to transmit a null data packet (NDP) at a first transmission interval, wirelessly receiving the NDP at the first transmission interval, and generating a reception report describing reception of the NDP and including beamforming information;
- causing a second AP device to generate a corresponding reception report describing a corresponding wireless detection of the NDP at the first transmission interval; and
- causing the mobile constrained network device to connect to a selected one of the first AP device or the second AP device for an identified data flow based on the respective reception reports from the first and second AP devices.

18. The one or more non-transitory tangible media of claim 17, further operable for:
- sending to the first AP device and the second AP device an instruction specifying a shared wireless channel for wireless reception of the NDP by each of the first and second AP devices at the first reception interval;
- wherein the instruction specifies the shared wireless channel concurrent reception of a plurality of the NDP responses at respective prescribed instances of the first reception interval.

19. The one or more non-transitory tangible media of claim 17, wherein the causing the mobile constrained network device to connect to the selected one AP device is based on generating a prioritized list of the first and second AP devices, for AP device selection by the mobile constrained network device, based on one or more of:
- delay encountered by a corresponding AP device with the mobile constrained network device;
- jitter encountered by the corresponding AP device with the mobile constrained network device;
- traffic load on the corresponding AP device by other mobile network devices;
- throughput availability of the corresponding AP device; or
- a modulation and coding scheme (MCS) used by the mobile constrained network device.

20. The one or more non-transitory tangible media of claim 17, wherein the causing the mobile constrained network device to connect to the selected one AP device is based on:
- scheduling and selecting the mobile constrained network device for connection to the selected one AP device within a bounded latency relative to an identified deadline required by the mobile constrained network device based on a determined signal quality and available bandwidth of the one AP device;
- the scheduling and selecting of the selected one AP device being relative to other mobile network devices contending for access to any one or more of the first AP device, the second AP device, or other AP devices providing reachability within a data network managed by the network controller device.

* * * * *